(12) United States Patent
Zhou et al.

(10) Patent No.: US 10,719,954 B2
(45) Date of Patent: Jul. 21, 2020

(54) METHOD AND ELECTRONIC DEVICE FOR EXTRACTING A CENTER POSITION OF AN INFRARED SPOT

(71) Applicant: SHENZHEN CAMSENSE TECHNOLOGIES CO., LTD, Shenzhen, Guangdong (CN)

(72) Inventors: Kun Zhou, Guangdong (CN); Le Li, Guangdong (CN); Zeming Lin, Guangdong (CN)

(73) Assignee: SHENZHEN CAMSENSE TECHNOLOGIES CO., LTD Shenzhen (CN)

( * ) Notice: Subject to any disclaimer, the term of this patent is extended or adjusted under 35 U.S.C. 154(b) by 151 days.

(21) Appl. No.: 16/106,371

(22) Filed: Aug. 21, 2018

(65) Prior Publication Data

US 2018/0357787 A1    Dec. 13, 2018

Related U.S. Application Data

(63) Continuation of application No. PCT/CN2017/118355, filed on Dec. 25, 2017.

(30) Foreign Application Priority Data

Apr. 1, 2017   (CN) .......................... 2017 1 0214281

(51) Int. Cl.
*G06T 7/73* (2017.01)
*G06K 9/40* (2006.01)
(Continued)

(52) U.S. Cl.
CPC ............. *G06T 7/73* (2017.01); *G06K 9/40* (2013.01); *G06K 9/4638* (2013.01); *G06K 9/52* (2013.01);
(Continued)

(58) Field of Classification Search
CPC ... G06T 7/73; G06T 7/187; G06T 7/11; G06T 5/002; G06T 5/009; G06T 5/40; G06K 9/40; G06K 9/4638; G06K 9/52
See application file for complete search history.

(56) References Cited

U.S. PATENT DOCUMENTS 8,068,673 B2    11/2011   Zhang et al.
9,274,203 B1 *   3/2016   Yap ......................... G01S 3/783
(Continued)

FOREIGN PATENT DOCUMENTS

CN           1987346 A       6/2007
CN         101344967 A       1/2009
(Continued)

*Primary Examiner* — Leon Flores

(57) ABSTRACT

A method for extracting a center position of an infrared spot is disclosed. The method includes: acquiring, by an electronic device, an image, wherein the image includes an infrared spot; denoising, by the electronic device, the image; binarizing, by the electronic device, the denoised image; extracting, by the electronic device, a connected component of the infrared spot in the binarized image, wherein the connected component includes a plurality of pixel intensities and pixel positions of the infrared spot; and calculating, by the electronic device, the center position of the infrared spot based on the extracted connected component.

18 Claims, 5 Drawing Sheets

(51) Int. Cl.
*G06T 5/00* (2006.01)
*G06T 5/40* (2006.01)
*G06K 9/46* (2006.01)
*G06T 7/187* (2017.01)
*G06T 7/11* (2017.01)
*G06K 9/52* (2006.01)

(52) U.S. Cl.
CPC ............. *G06T 5/002* (2013.01); *G06T 5/009* (2013.01); *G06T 5/40* (2013.01); *G06T 7/11* (2017.01); *G06T 7/187* (2017.01); *G06T 2207/10048* (2013.01)

(56) References Cited

U.S. PATENT DOCUMENTS

2008/0131002 A1    6/2008  Zhang et al.
2016/0291800 A1*  10/2016  Okabayashi ............ G06F 3/017

FOREIGN PATENT DOCUMENTS

| CN | 101907954 A | 12/2010 |
| CN | 105469084 A |  4/2016 |
| CN | 106097317 A | 11/2016 |
| CN | 107133627 A |  9/2017 |

* cited by examiner

METHOD AND ELECTRONIC DEVICE FOR EXTRACTING A CENTER POSITION OF AN INFRARED SPOT

CROSS-REFERENCE TO RELATED APPLICATIONS

This disclosure is a continuation of International Patent Application No. PCT/CN2017/118355, filed on Dec. 25, 2017, which is based upon and claims priority to Chinese Patent Application No. 201710214281.4, filed on Apr. 1, 2017, the entire contents of which are incorporated herein by reference.

TECHNICAL FIELD

The present disclosure relates to the technical field of image processing, and in particular, relates to a method and an electronic device for extracting a center position of an infrared spot.

BACKGROUND

In a position tracking system for a fixed point of an industrial robot, a service robot or virtual reality (VR), tracking based on an infrared active light source is generally employed because the infrared active light source is capable of preventing interference from other wavelengths and improving accuracy and stability of the tracking system. In the tracking based on the infrared active light source, exposing and sampling is performed in real time by using an infrared sensor camera, acquired data is transmitted to an upper computer, the upper computer parses each spot according to the received data to calculate a center position of the spot, and then calculates a position and posture of a target object according to the center position of the spot.

In the above process, the center position of the spot is quickly and accurately calculated, which ensures the precision and capability of tracking a moving object of the tracking system. A most direct method for improving the measurement precision is using a video camera system having a higher resolution, which, however, increases the cost.

SUMMARY

An embodiment of the present disclosure provides a method for extracting a center position of an infrared spot. The method includes: acquiring, by an electronic device, an image, wherein the image includes an infrared spot; denoising, by the electronic device, the image; binarizing, by the electronic device, the denoised image; extracting, by the electronic device, a connected component of the infrared spot in the binarized image, wherein the connected component includes a plurality of pixel intensities and pixel positions of the infrared spot; and calculating, by the electronic device, the center position of the infrared spot based on the extracted connected component.

Another embodiment of the present disclosure provides an electronic device. The electronic device includes: at least one processor; and a memory communicably connected to the at least one processor; wherein the memory stores instructions executable by the at least one processor, wherein, the instructions, when being executed by the at least one processor, cause the at least one processor to: acquire an image, wherein the image includes an infrared spot; denoise the image; binarize the denoised image; extract a connected component of the infrared spot in the binarized image, wherein the connected component includes a plurality of pixel intensities and pixel positions of the infrared spot; and calculate the center position of the infrared spot based on the extracted connected component.

Still another embodiment of the present disclosure provides a non-volatile computer readable memory medium storing computer executable instructions, wherein the computer executable instructions, when being executed, cause a computer to: acquire an image, wherein the image includes an infrared spot; denoise the image; binarize the denoised image; extract a connected component of the infrared spot in the binarized image, wherein the connected component includes a plurality of pixel intensities and pixel positions of the infrared spot; and calculate the center position of the infrared spot based on the extracted connected component.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

To make the objective, technical solution, and advantages of the present disclosure clearer, the present disclosure is further described with reference to specific embodiments and attached drawings. It should be understood that the specific embodiments described herein are only intended to explain the present disclosure instead of limiting the present disclosure.

Figure 1:
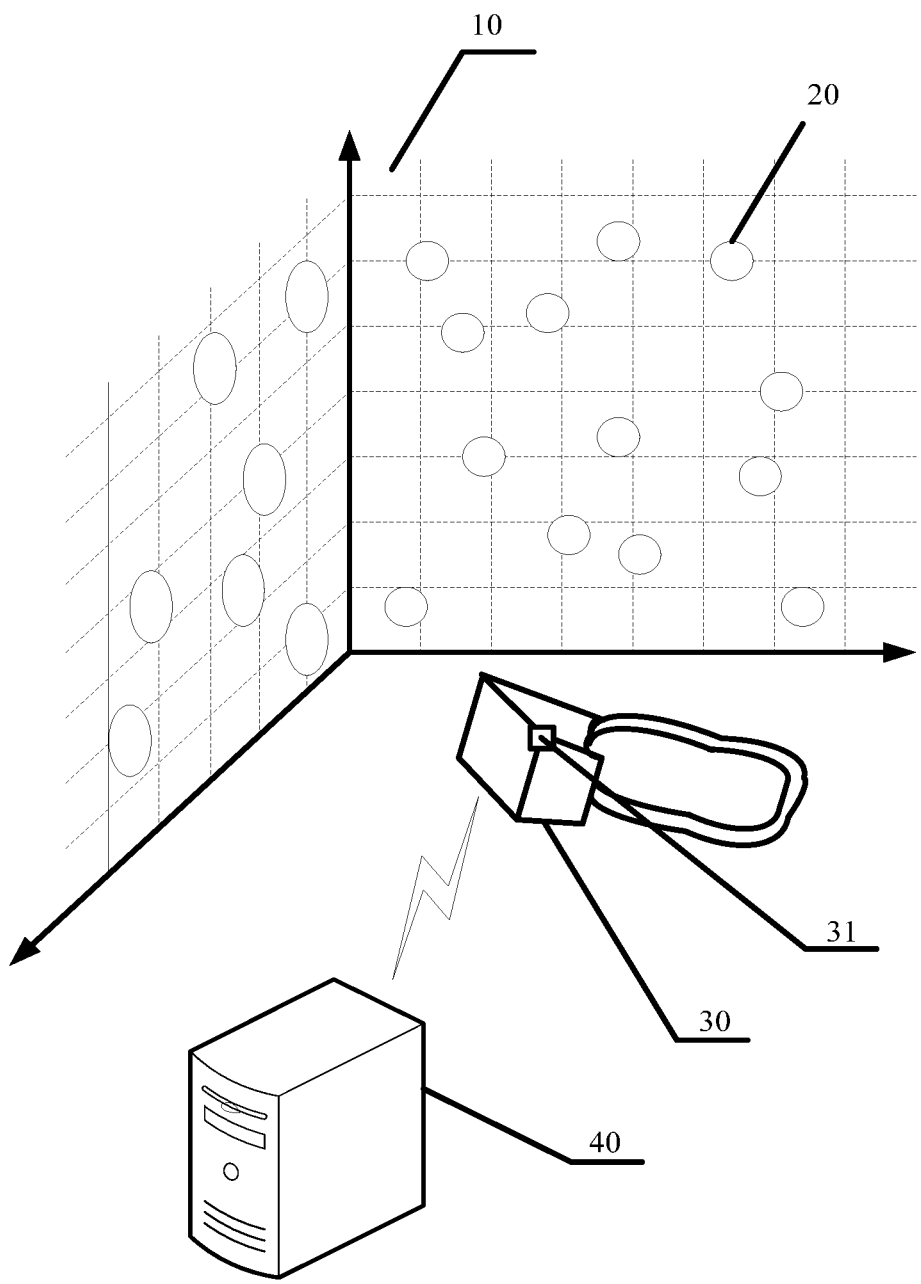
FIG. 1 is a schematic diagram of an application environment of a method for extracting a center position of an infrared spot according to an embodiment of the present disclosure.

Referring to FIG. 1, FIG. 1 is a schematic diagram of an application environment of a method for extracting a center position of an infrared spot according to an embodiment of the present disclosure. As illustrated in FIG. 1, in the application environment, a virtual reality (VR) three-dimensional space 10, a plurality of infrared lamps 20, a VR device 30 and a processor 40 are included. The VR device 30 comprises an image acquiring apparatus 31.

The plurality of infrared lamps 20 is fixed to positions of a rigid object's markers, and each marker is provided with an infrared lamp. The plurality of infrared lamps 20 is capable of emitting infrared light to the VR three-dimensional space 10.

The VR device 30 may be any type of a device that is capable of interacting with a user or providing a virtual reality service for the user, for example, a VR helmet, a VR game pad or the like. The image acquiring apparatus 31 may be any suitable type of electronic device that has at least one photosensitive element (for example, a CCD or a CMOS), for example, a video camera, a digital camera, a video recorder or the like. The image acquiring apparatus 31 is configured to perform real-time exposure and sample for the infrared light emitted by the infrared lamps 20.

The processor 40 may be specifically any suitable type of electronic computing device, for example, a multi-core central processing unit, a computer, a server, a game console or the like. The processor 40 may receive a series of image information, for example, images including the infrared spot acquired by the image acquiring apparatus 31, and track the position of the VR device in the three-dimensional space according to the acquired images. The processor 40 provides different types of immersive experience for the user based on the position track information of the VR device 30, for example, making a corresponding action in a picture displayed in virtual reality by detecting a position change of the VR game pad, and instructing the user to lift his or her hands or change positions of some articles in the game. In some embodiments, the processor 40 may be arranged inside the VR device 30 or independently arranged, and the VR device 30 may establish a communication connection with the processor 40 via a wireless/wired communication manner.

For example, as illustrated in FIG. 1, the VR device 30 may be a VR helmet worn on the head of the user, and the image acquiring apparatus 31 may be a video camera arranged on the VR helmet. The video camera is arranged in the front of the helmet and is capable of acquiring images of a front side of the head of the user. In some embodiments, the video camera may also be arranged at other positions of the VR helmet, and configured to acquire images from different view angles. Two or more video cameras may also be arranged to acquire images from more directions (or view angles), and thus provide a more accurate and stable position calculation result.

The plurality of infrared lamps 20 is respectively arranged at various positions in the three-dimensional space 10, and blink at a specific frequency or in a specific mode. Therefore, the images acquired by the image acquiring apparatus 31 may include spots having a specific area that are determined by the luminance of the plurality of infrared lamps 20. The processor 40 may obtain a center position of the spot by identifying such spots in the image information and then parsing each of the spots, and calculate the position of three degrees of freedom and the posture of three degrees of freedom of a rigid body according to the center position of the spot, such that the position track of the VR device in the three-dimensional space is implemented.

It should be noted that FIG. 1 only illustrates one VR device 30 and one processor 40. However, a person skilled in the art would understand that the application environment of the method for extracting a center position of an infrared spot may include VR devices 30 and processors 40 in any quantity.

Figure 2:
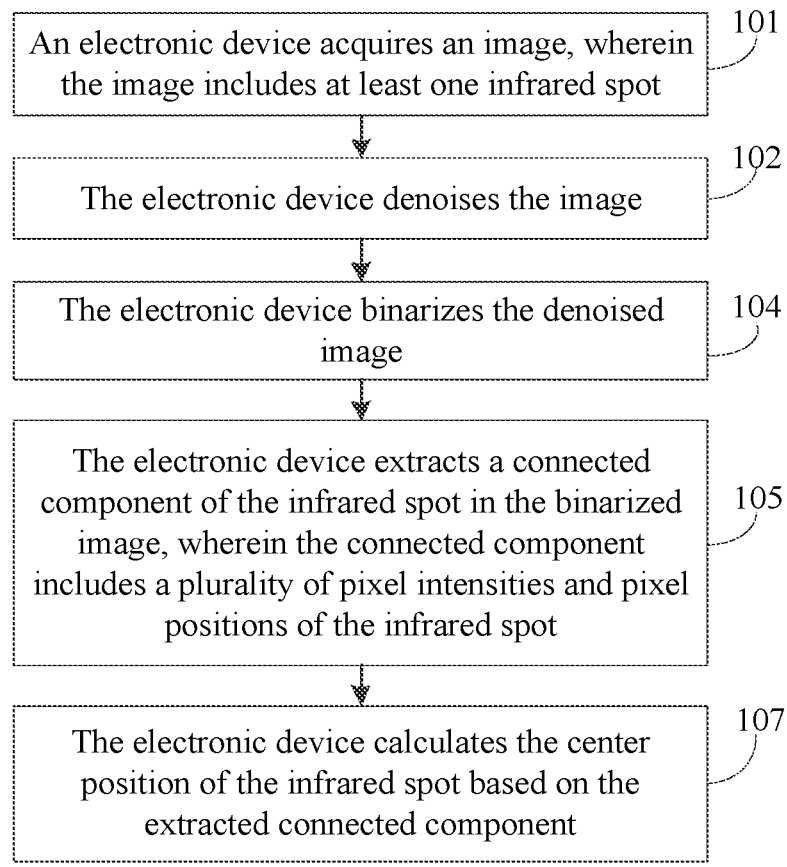
FIG. 2 is a schematic flowchart of a method for extracting a center position of an infrared spot according to an embodiment of the present disclosure.

In combination with the above application environment, as illustrated in FIG. 2, the specific process of the method for extracting a center position of an infrared spot according to the embodiment of the present disclosure is further illustrated. The process includes the following steps:

In step 101: an electronic device acquires an image, wherein the image includes at least one infrared spot;

In step 102: the electronic device denoises the image;

In step 104: the electronic device binarizes the denoised image;

In step 105: the electronic device extracts a connected component of the infrared spot in the binarized image, wherein the connected component includes a plurality of pixel intensities and pixel positions of the infrared spot; and In step 107: the electronic device calculates the center position of the infrared spot based on the extracted connected component.

In the embodiment of the present disclosure, the light emitted by the infrared lamps may be captured by an infrared camera. The infrared light emitted by each infrared lamp converges to form a small-size spot, and the infrared camera captures an image including the spot.

The captured image is denoised to restore an original image from a noise image and to maintain detail information in the image as much as possible. A conventional method for denoising image includes a local method and a non-local method. The local method is to perform a convolution operation for the image by using a kernel, which uses a spatial position relationship between pixels. The non-local method means that the spatial positions between the pixels are subject to no substantial relationship, but are only relevant to an image measuring a similarity between the pixels.

In this embodiment, the image may be denoised by Gaussian filtering, wherein a Gaussian kernel of the filtering may be 3×3 or other values. The Gaussian filtering is a linear smooth filtering which is suitable for eliminating Gaussian noise. The specific process of eliminating the image noise by using the Gaussian filtering is scanning each pixel in the image by using a template, and then replacing a value of the central pixel of the template with a weighted average grayscale value of the pixel in the field determined by the template. The Gaussian filtering is a local method for denoising.

In some embodiments, the non-local method may also be used to denoise the acquired image. For example, a non-local average value image denoising method may be used based on image gradient component singular value decomposition, wherein local structural features of the image are extracted by using the gradient component singular value decomposition, a set of similar pixel points is generated according to the extracted features, and then an image having a similar feature value with the current pixel is selected based on the set of similar pixel points. Since the size of the set of similar pixel points affects the performance of denoising, a set of similar pixel points having a suitable size may be employed, for example, 40% to 60% of the elements in the set of similar pixel points in the current search range.

It should be noted that the method for denosing the image is not limited to the above method, and the acquired image may also be denoised by using other methods. After the image is denoised, the effective pixels of the spots may be effectively expanded.

The denoised image is then binarized. Binarization of the image is setting the grayscale value of the pixel points on the image to 0 or 255, such that the entire image exhibits an obvious black and white effect.

The image may be binarized by defining a threshold. For example, a grayscale value is found from an image having an original grayscale based on a standard and is then used as a threshold T, the image is partitioned into two parts, wherein the part with the grayscale value greater than T is a white part, and the part with the grayscale value less than T is a black part, and hence the binarized image is generated. Value taking of the threshold is critical in the threshold segmentation technology. For example, an initial threshold for image binarization is acquired by using the traditional maximum between-class variance method (OSTU). In some embodiments, based on the characteristic that illumination distribution of the infrared image is not uniform, a single-column binarization processing may be firstly applied to the image, that is, the OSTU processing is performed for each column to obtain the initial threshold, and then a final binarization threshold is obtained by adjusting the initial threshold according to the illumination when the image is shot, such that the entire image may be binarized by using an averaging method or other methods.

It should be noted that the binarization method according to the embodiment of the present disclosure is not limited to the above method, and instead the image may also be binarized by using other methods.

Further, a connected component of the infrared spot in the image is extracted based on the binarized image. Herein, one image experienced binarization generally includes a plurality of regions, and these regions need to be extracted by means of marking, and a simple and effective method for marking various regions in the segmented image is to detect a connectivity between each pixel and adjacent pixels thereof. The common adjacent relationship includes 4-adjacency and 8-adjaceny. The method for extracting the connected component of a binary image has been described in the related art, which is thus not described herein any further.

Figure 3:
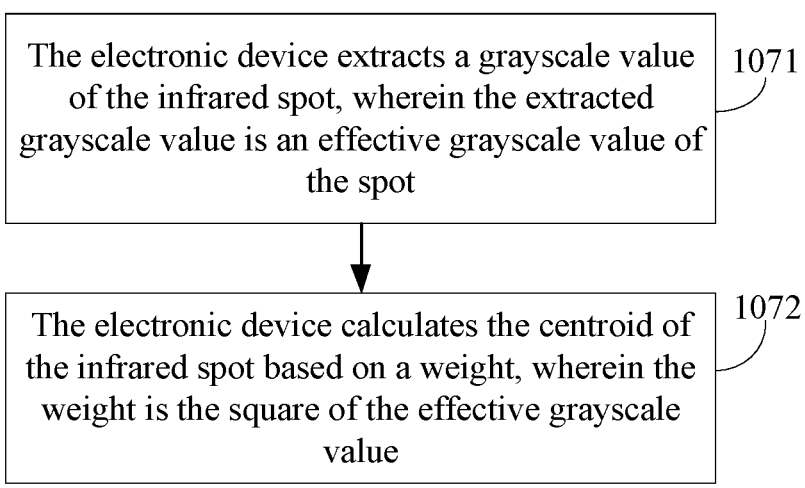
FIG. 3 is a schematic flowchart of a method for calculating a center position of the infrared spot in the method for extracting the center position of the infrared spot according to an embodiment of the present disclosure.

After the connected component of the binary image is selected, the center position of the infrared spot is calculated based on the extracted connected component. As illustrated in FIG. 3, the process specifically includes the following steps:

In step 1071: the electronic device extracts a grayscale value of the infrared spot, wherein the extracted grayscale value is an effective grayscale value of the spot; and In step 1072: the electronic device calculates the centroid of the infrared spot based on a weight, wherein the weight is the square of the effective grayscale value.

A two-dimensional coordinate system may be established based on the infrared spot image, and then the centroid of the infrared spot is calculated based on the following formula:

$$x = \frac{\sum_{(i,j)\in S} iI(i,j)^2}{\sum_{(i,j)\in S} I(i,j)^2}, y = \frac{\sum_{(i,j)\in S} jI(i,j)^2}{\sum_{(i,j)\in S} I(i,j)^2}$$

Wherein, I(i, j) is a grayscale value of a pixel point with coordinates (i, j), S is a set of pixels in the connected component, and (x, y) are coordinates corresponding to the center of the infrared spot. Herein, using a square of the grayscale value as a weight improves the precision of the center position of the infrared spot, such that a more accurate center position of the infrared spot is acquired.

An embodiment of the present disclosure provides a method for extracting a center position of an infrared spot. According to the method, an acquired image including an infrared spot is firstly denoised and binarized, then a connected component of the infrared spot in the denoised and binarized image is extracted, and finally the center position of the infrared spot is calculated based on the extracted connected component. With this method, a more accurate center position of the infrared spot may be obtained, such that the center position of the infrared spot is stabilized at a subpixel level.

Figure 4:
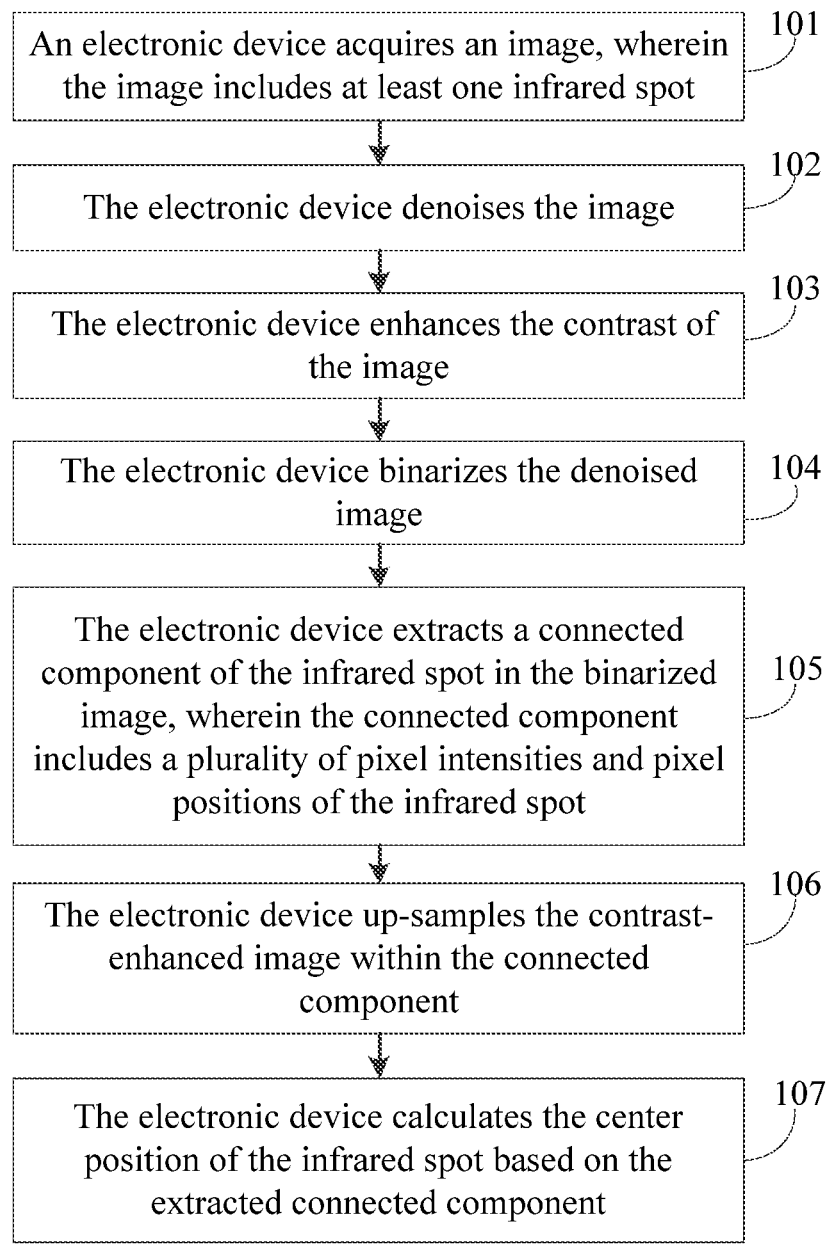
FIG. 4 is a schematic flowchart of a method for extracting a center position of an infrared spot according to another embodiment of the present disclosure.

Referring to FIG. 4, another embodiment of the present disclosure provides a method for extracting a center position of an infrared spot. Different from FIG. 2, in FIG. 4, prior to the electronic device binarizing the denoised image, the method further includes the following step:

In step 103: the electronic device enhances the contrast of the image.

Upon the electronic device extracting a connected component of the infrared spot in the binarized image, the method further includes the following step:

In step 106: the electronic device up-samples the contrast-enhanced image within the connected component.

Wherein, enhancing the contrast of the image includes transforming the grayscale value of the image by using a linear function or a non-linear function, for example, a sigma function, an exponential function or the like. The enhancing the contrast of the image further includes a histogram equalization method, a histogram specification method, a homomorphic filter and the like method.

Wherein, the histogram equalization method is substantially broadening of a specific region, which, however, results in transformation of the entire image towards a bright region. Therefore, in some embodiments, with respect to the defect of the histogram equalization method, frequency information of the image is introduced into the original histogram to form a weighted histogram, then platform equalization is performed for the weighted histogram, and finally the image pixels upon the platform equalization are adjusted based on a frequency factor to enhance the image.

In this embodiment, by enhancement of the denoised image, the spot is clearer and the edge is refined, which reduces the impacts caused by the edge pixels of the image to the center position of the infrared spot, such that the center position of the infrared spot is stabilized at a subpixel level.

After the enhanced image is binarized and the connected component of the infrared spot in the binarized image is extracted, in the method, the image in the extracted connected component is further up-sampled. The up-sampling is mainly intended to obtain an image having a higher resolution and expand the border of the effective pixels in the extracted connected component. When the center position of the infrared spot is calculated based on the extracted connected component subsequently, disturbance caused by the pixel points at the edge of the extracted connected component to the center position of the infrared spot may be reduced as much as possible.

The enhanced image in the extracted connected component may be further n-fold up-sampled, wherein the value of n is determined according to the specific application scenario. The up-sampling includes a bilinear interpolation method, a nearest neighbor interpolation, a cubic convolution interpolation method and the like. The process of scaling the image by using these three methods has been described in the related art, which is thus not described herein any further.

It should be noted that after the image in the extracted connected component is up-sampled, in step 107, the center position of the infrared spot is calculated based on the image in the extracted connected component upon the up-sampling.

Figure 5:
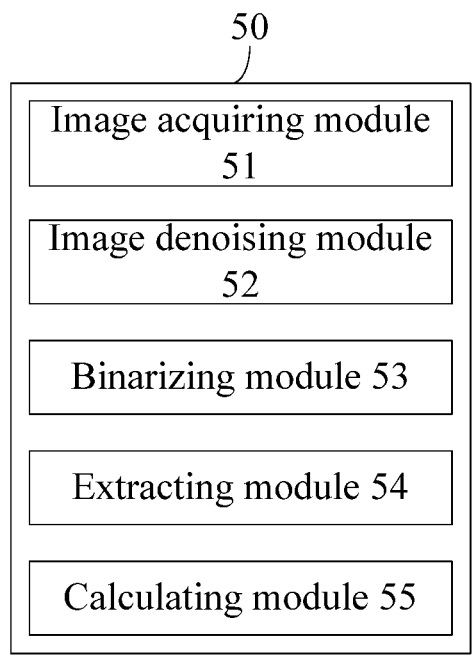
FIG. 5 is a schematic structural diagram of an apparatus for extracting a center position of an infrared spot according to an embodiment of the present disclosure.

Referring to FIG. 5, FIG. 5 is a schematic structural diagram of an apparatus 50 for extracting a center position of an infrared spot according to an embodiment of the present disclosure. As illustrated in FIG. 5, the apparatus 50 includes: an image acquiring module 51, an image denoising module 52, a binarizing module 53, an extracting module 54 and a calculating module 55.

Wherein, the image acquiring module 51 is configured to acquire an image, wherein the image includes at least one infrared spot; the image denoising module 52 is configured to denoise the image; the binarizing module 53 is configured to binarize the denoised image; the extracting module 54 is configured to extract a connected component of the infrared spot in the binarized image, wherein the connected component includes a plurality of pixel intensities and pixel positions of the infrared spot; and the calculating module 55 is configured to calculate the center position of the infrared spot based on the extracted connected component.

Wherein, the calculating module 55 includes an extracting unit and a calculating unit. The extracting unit is configured to extract a grayscale value of the infrared spot, wherein the extracted grayscale value is an effective grayscale value of the spot; and the calculating unit is configured to calculate the centroid of the infrared spot based on a weight, wherein the weight is the square of the effective grayscale value. The centroid of the infrared spot is calculated based on the following calculation formula:

$$x = \frac{\sum_{(i,j) \in S} i I(i,j)^2}{\sum_{(i,j) \in S} I(i,j)^2}, \; y = \frac{\sum_{(i,j) \in S} j I(i,j)^2}{\sum_{(i,j) \in S} I(i,j)^2}$$

Wherein, I(i, j) is a grayscale value of a pixel point with coordinates (i, j), S is a set of pixels in the connected component, and (x, y) are coordinates corresponding to the center of the infrared spot.

It should be noted that: since the contents such as information interaction between modules and units in the apparatus and execution processes are based on the same concept as method embodiments of the present disclosure, the specific content may refer to the description of the method embodiments of the present disclosure, which is not defined herein any further.

An embodiment of the present disclosure provides an apparatus for extracting a center position of an infrared spot. In the apparatus, an acquired image including an infrared spot is firstly denoised and binarized, then a connected component of the infrared spot in the denoised and binarized image is extracted, and finally the center position of the infrared spot is calculated based on the extracted connected component. With this apparatus, a more accurate center position of the infrared spot may be obtained, such that the center position of the infrared spot is stabilized at a subpixel level.

Figure 6:
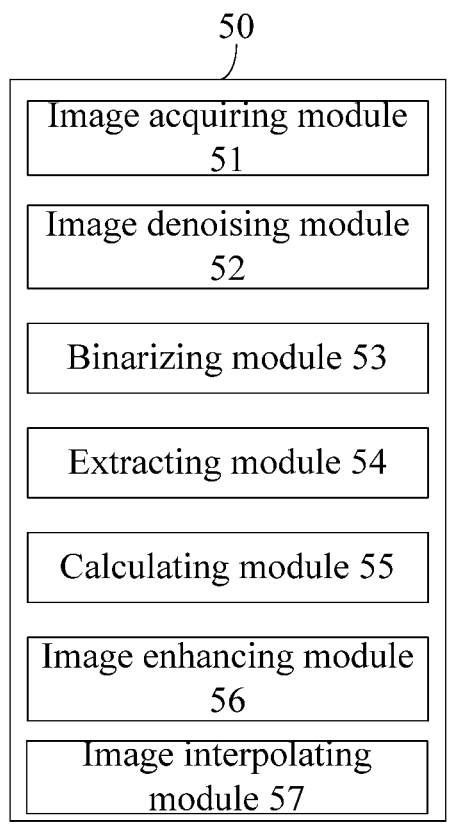
FIG. 6 is a schematic structural diagram of an apparatus for extracting a center position of an infrared spot according to another embodiment of the present disclosure.

Referring to FIG. 6, FIG. 6 is a schematic structural diagram of an apparatus for extracting a center position of an infrared spot according to another embodiment of the present disclosure. Different from FIG. 5, as illustrated in FIG. 6, the apparatus further includes: an image enhancing module 56 and an image interpolating module 57.

Wherein, the image enhancing module 56 is configured to enhance the contrast of the image, and the image interpolating module 57 is configured to upsample the contrast-enhanced image within the extracted connected component.

It should be noted that: since the contents such as information interaction between modules and units in the apparatus and execution processes are based on the same concept as method embodiments of the present disclosure, the specific content may refer to the description of the method embodiments of the present disclosure, which is not defined herein any further.

In this embodiment, by enhancement of the denoised image, the spot is clearer and the edge is refined, which reduces the impacts caused by the edge pixels of the image to the center position of the infrared spot, such that the center position of the infrared spot is stabilized at a subpixel level. In addition, after the enhanced binarized image in the range of the extracted connected component is upsampled, an image having a higher resolution may be obtained and the border of the effective pixels in the extracted connected component may be expanded. When the center position of the spot is calculated based on the extracted connected component subsequently, disturbance caused by the pixel points at the edge of the extracted connected component to the center position of the infrared spot may be reduced as much as possible.

Figure 7:
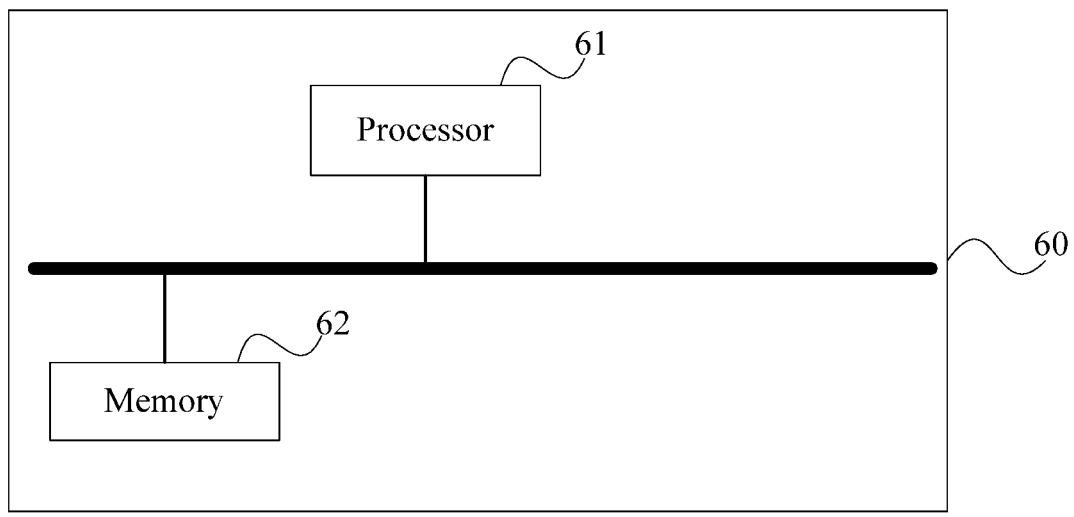
FIG. 7 is a schematic structural diagram of hardware of an electronic device for performing the method for extracting a center position of an infrared spot according to an embodiment of the present disclosure.

Referring to FIG. 7, FIG. 7 is a schematic structural diagram of hardware of an electronic device 60 for performing the method for extracting a center position of an infrared spot according to an embodiment of the present disclosure.

As illustrated in FIG. 7, the electronic device 60 includes at least one processor 61 and a memory 62, and FIG. 16 uses one processor 61 as an example.

The at least one processor 61 and the memory 62 may be connected via a bus or in another manner, and FIG. 7 uses connection via the bus as an example.

The memory 62, as a non-volatile computer readable memory medium, may be configured to store non-volatile software programs, and non-volatile computer executable programs and modules, for example, the program instructions/modules (for example, the image acquiring module 51, the image denoising module 52, the binarizing module 53, the extracting module 54 and the calculating module 55 as illustrated in FIG. 5) corresponding to the methods for extracting a center position of an infrared spot in the embodiments of the present disclosure. The non-volatile software programs, instructions and modules stored in the memory 62, when being executed, cause the processor 61 to perform various function applications and data processing of the electronic device, that is, performing the methods for extracting a center position of an infrared spot in the above method embodiments.

The memory 62 may include a program memory area and a data memory area, wherein the program memory area may store operation systems and application programs needed by at least function; and the data memory area may store data created according to the usage of the apparatus for extracting a center position of an infrared spot. In addition, the memory 62 may include a high speed random access memory, or include a non-volatile memory, for example, at least one disk storage device, a flash memory device, or another non-volatile solid storage device. In some embodiments, the memory 62 optionally includes memories remotely configured relative to the processor 61. These memories may be connected to an apparatus for extracting a center position of an infrared spot over a network. The above examples of network include, but not limited to, the Internet, Intranet, local area network, mobile communication network and a combination thereof.

One or more modules are stored in the memory 62, and when being executed by the at least one processor 61, perform the method for extracting a center position of an infrared spot according to any of the above method embodiments, for example, performing steps 101, 102, 104, 105 and 107 in the method as illustrated in FIG. 2 and steps 1071 to 1072 in the method as illustrated in FIG. 3, and steps 101 to 107 in the method as illustrated in FIG. 4; and implementing the functions of the modules 51 to 55 as illustrated in FIG. 5 and the modules 51 to 57 as illustrated in FIG. 6.

The product may perform the method according to the embodiments of the present disclosure, has corresponding function modules for performing the method, and achieves the corresponding beneficial effects. For technical details that are not illustrated in detail in this embodiment, reference may be made to the description of the methods according to the embodiments of the present disclosure.

The electronic device in the embodiments of the present disclosure is practiced in various forms, including, but not limited to:

(1) an entertainment device: which acquires images, displays and plays the content of the images; this device also includes an VR device;

(2) a server: which provides services for computers, and includes a processor, a hard disk, a memory, a system bus and the like; the server is similar to the general computer in terms of architecture; however, since more reliable services need to be provided, higher requirements are imposed on the processing capability, stability, reliability, security, extensibility, manageability and the like of the device; and (3) other electronic devices having the data interaction function.

An embodiment of the present disclosure further provides a non-volatile computer readable memory medium storing computer executable instructions. The computer executable instructions, when being executed by at least one processor, cause the at least one processor to perform the method for extracting a center position of an infrared spot according to any of the above method embodiments, for example, performing steps 101, 102, 104, 105 and 107 in the method as illustrated in FIG. 2 and steps 1071 to 1072 in the method as illustrated in FIG. 3, and steps 101 to 107 in the method as illustrated in FIG. 4; and implementing the functions of the modules 51 to 55 as illustrated in FIG. 5 and the modules 51 to 57 as illustrated in FIG. 6.

An embodiment of the present disclosure further provides a computer program product. The computer program product includes a computer program stored on a non-volatile computer readable memory medium. The computer program includes program instructions. The computer instructions, when being executed by a computer, cause the computer to perform the method for extracting a center position of an infrared spot according to any of the above method embodiments, for example, performing steps 101, 102, 104, 105 and 107 in the method as illustrated in FIG. 2 and steps 1071 to 1072 in the method as illustrated in FIG. 3, and steps 101 to 107 in the method as illustrated in FIG. 4; and implementing the functions of the modules 51 to 55 as illustrated in FIG. 5 and the modules 51 to 57 as illustrated in FIG. 6.

According to the above embodiments of the present disclosure, a person skilled in the art may clearly understand that the embodiments of the present disclosure may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer readable memory medium and may be executed by at least one processor. When the program runs, the steps of the methods in the embodiments are performed. The memory medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for extracting a center position of an infrared spot, comprising: acquiring, by an electronic device, an image, wherein the image comprises the infrared spot; denoising, by the electronic device, the image to generate a denoised image; enhancing, by the electronic device, a contrast of the denoised image to generate a contrast-enhanced image; binarizing, by the electronic device, the contrast-enhanced image to generate a binarized image; extracting, by the electronic device, a connected component of the infrared spot in the binarized image, wherein the connected component comprises a plurality of pixel intensities and pixel positions of the infrared spot; up-sampling, by the electronic device, the contrast-enhanced image within the extracted connected component; and calculating, by the electronic device, the center position of the infrared spot based on the extracted connected component.

2. The method according to claim 1, wherein the enhancing, by the electronic device, the contrast of the image is performed by a histogram equalization method, the histogram equalization method comprises:
introducing, by the electronic device, frequency information of the image into an original histogram to form a weighted histogram;
performing, by the electronic device, a platform equalization for the weighted histogram; and
adjusting, by the electronic device, the pixels of the image upon the platform equalization based on a frequency factor to enhance the contrast of the image.

3. The method according to claim 1, wherein the denoising, by the electronic device, the image comprises: filtering, by the electronic device, the image with a Gaussian kernel.

4. The method according to claim 1, wherein binarizing, by the electronic device, the contrast-enhanced image by a maximum between-class variance processing method.

5. The method according to claim 1, wherein the calculating, by the electronic device, the center position of the infrared spot based on the extracted connected component comprises:

extracting, by the electronic device, a grayscale value of the infrared spot, wherein the extracted grayscale value is an effective grayscale value of the spot; and calculating, by the electronic device, the centroid of the infrared spot based on a weight, wherein the weight is the square of the effective grayscale value.

6. The method according to claim 5, wherein calculating, by the electronic device, the centroid of the infrared spot based on the following calculation formula:

$$x = \frac{\sum_{(i,j) \in S} iI(i, j)^2}{\sum_{(i,j) \in S} I(i, j)^2}, y = \frac{\sum_{(i,j) \in S} jI(i, j)^2}{\sum_{(i,j) \in S} I(i, j)^2}$$

wherein I(i, j) is a grayscale value of a pixel point with coordinates (i, j), S is a set of pixels in the connected component, (x, y) are coordinates corresponding to the center of the infrared spot.

7. An electronic device, comprising: at least one processor; and a memory communicably connected to the at least one processor; wherein the memory stores instructions executable by the at least one processor, wherein, the instructions, when being executed by the at least one processor, cause the at least one processor to: acquire an image, wherein the image comprises an infrared spot; denoise the image to generate a denoised image; enhance a contrast of the denoised image to generate a contrast-enhanced image; binarize the contrast-enhanced image to generate a binarized image; extract a connected component of the infrared spot in the binarized image, wherein the connected component comprises a plurality of pixel intensities and pixel positions of the infrared spot; up-sample the contrast-enhanced image within the extracted connected component: and calculate the center position of the infrared spot based on the extracted connected component.

8. The electronic device according to claim 7, wherein the enhancing the contrast of the image is performed by a histogram equalization method, the histogram equalization method comprises:

introducing frequency information of the image into an original histogram to form a weighted histogram;

performing a platform equalization for the weighted histogram; and adjusting the pixels of the image upon the platform equalization based on a frequency factor to enhance the contrast of the image.

9. The electronic device according to claim 7, wherein the denoising the image comprises: filtering the image with a Gaussian kernel.

10. The electronic device according to claim 7, wherein binarizing the contrast-enhanced image by a maximum between-class variance processing method.

11. The electronic device according to claim 7, wherein the calculating the center position of the infrared spot based on the extracted connected component comprises:

extracting a grayscale value of the infrared spot, wherein the extracted grayscale value is an effective grayscale value of the spot; and calculating the centroid of the infrared spot based on a weight, wherein the weight is the square of the effective grayscale value.

12. The electronic device according to claim 11, wherein calculating the centroid of the infrared spot based on the following calculation formula:

$$x = \frac{\sum_{(i,j) \in S} iI(i, j)^2}{\sum_{(i,j) \in S} I(i, j)^2}, y = \frac{\sum_{(i,j) \in S} jI(i, j)^2}{\sum_{(i,j) \in S} I(i, j)^2}$$

wherein I(i, j) is a grayscale value of a pixel point with coordinates (i, j), S is a set of pixels in the connected component, and (x, y) are coordinates corresponding to the center of the infrared spot.

13. A non-transitory computer readable memory medium storing computer executable instructions, wherein the non-transitory computer readable memory medium is executed by a processor and the computer executable instruction, when being executed, cause a computer the processor to: acquire an image, wherein the image comprises an infrared spot; denoise the image to generate a denoised image; enhance a contrast of the denoised image to generate a contrast-enhanced image; binarize the contrast-enhanced image to generate a binarized image; extract a connected component of the infrared spot in the binarized image, wherein the connected component comprises a plurality of pixel intensities and pixel positions of the infrared spot; up-sample the contrast-enhanced image within the extracted connected component: and calculate the center position of the infrared spot based on the extracted connected component.

14. The non-transitory computer readable memory medium according to claim 13, wherein the enhancing the contrast of the image is performed by a histogram equalization method, the histogram equalization method comprises:

introducing frequency information of the image into an original histogram to form a weighted histogram;

performing a platform equalization for the weighted histogram; and adjusting the pixels of the image upon the platform equalization based on a frequency factor to enhance the contrast of the image.

15. The non-transitory computer readable memory medium according to claim 13, wherein the denoising the image comprises: filtering the image with a Gaussian kernel.

16. The non-transitory computer readable memory medium according to claim 13, wherein the calculating the center position of the infrared spot based on the extracted connected component comprises:

extracting a grayscale value of the infrared spot, wherein the extracted grayscale value is an effective grayscale value of the spot; and calculating the centroid of the infrared spot based on a weight, wherein the weight is the square of the effective grayscale value.

17. The non-transitory computer readable memory medium according to claim 16, wherein calculating the centroid of the infrared spot based on the following calculation formula:

$$x = \frac{\sum_{(i,j) \in S} iI(i,j)^2}{\sum_{(i,j) \in S} I(i,j)^2}, \ y = \frac{\sum_{(i,j) \in S} jI(i,j)^2}{\sum_{(i,j) \in S} I(i,j)^2}$$

wherein I(i, j) is a grayscale value of a pixel point with coordinates (i, j), S is a set of pixels in the connected component, and (x, y) are coordinates corresponding to the center of the infrared spot.

18. The non-transitory computer readable memory medium according to claim 13, wherein the non-volatile computer readable memory medium is a component of Virtual Reality system.

* * * * *